US009304504B2

(12) United States Patent
Sonoda (10) Patent No.: US 9,304,504 B2
(45) Date of Patent: Apr. 5, 2016

(54) SERVO CONTROLLER FOR REDUCING INTERFERENCE BETWEEN AXES IN MACHINING

(71) Applicant: FANUC CORPORATION, Minamitsuru-gun, Yamanashi (JP)

(72) Inventor: Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/662,409

(22) Filed: Mar. 19, 2015

(65) Prior Publication Data

US 2015/0268658 A1    Sep. 24, 2015

(30) Foreign Application Priority Data

Mar. 20, 2014  (JP) ................. 2014-058642

(51) Int. Cl.
*G05B 19/25*    (2006.01)
*G05B 19/19*    (2006.01)

(52) U.S. Cl.
CPC ...................... *G05B 19/19* (2013.01)

(58) Field of Classification Search
CPC ....................................... G05B 19/19
USPC .......................................... 318/570
See application file for complete search history.

(56) References Cited

U.S. PATENT DOCUMENTS 4,879,660 A    11/1989 Asakura

FOREIGN PATENT DOCUMENTS

| JP | 6458425 | 3/1989 |
| JP | 9-192929 | 7/1997 |
| JP | 3492583 B | 10/2001 |
| JP | 2005-96061 | 4/2005 |
| JP | 4658181 B | 4/2009 |

*Primary Examiner* — Erick Glass
(74) *Attorney, Agent, or Firm* — RatnerPrestia (57) ABSTRACT

The servo controller of the present invention includes a first axis speed feedback obtaining unit, a second axis speed feedback obtaining unit configured to obtain an amount of speed feedback for a second axis synchronizing with a first axis, a speed conversion unit configured to convert an amount of speed feedback for the first axis by using a conversion coefficient, a speed difference calculating unit configured to calculate a speed difference between the converted amount of speed feedback for the first axis and the amount of speed feedback for the second axis, a torque correction calculating unit configured to calculate a torque correction value by using the speed difference, a second axis torque command correcting unit using the torque correction value, a torque correction value converting unit using the conversion coefficient, and a first axis torque command correcting unit using the converted torque correction value.

5 Claims, 8 Drawing Sheets

SERVO CONTROLLER FOR REDUCING INTERFERENCE BETWEEN AXES IN MACHINING

CROSS-REFERENCE TO RELATED APPLICATIONS

This application is a new U.S. patent application that claims benefit of JP 2014-058642, filed on Mar. 20, 2014, the entire content of JP 2014-058642 is hereby incorporated by reference.

FIELD OF THE INVENTION

The present invention relates to a servo controller which controls a machine such as a machine tool using an electric motor, and more particularly, a servo controller which reduces vibration due to interference between a plurality of axes driven by electric motors at the time of machining during synchronization of the axes.

BACKGROUND OF THE INVENTION

In common machine tools and the like, when machining a workpiece by a tool, the object is machined with a plurality of axes driven by electric motors cooperatively synchronizing with each other.

Figure 1:
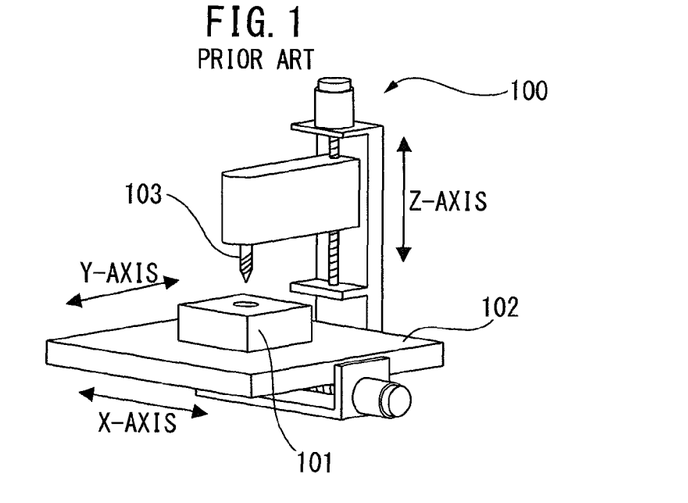
FIG. 1 is a perspective view of a conventional machining center.

As a machine tool which executes machining with a plurality of axes cooperatively synchronizing with each other, for example, such a vertical-type machining center as illustrated in FIG. 1 is known. In the vertical-type machining center 100, a table 102 which fixes a workpiece 101 moves in an X-axis direction and a Y-axis direction, and a rotary tool 103 moves in a Z-axis direction, so that machining is executed.

Figure 2:
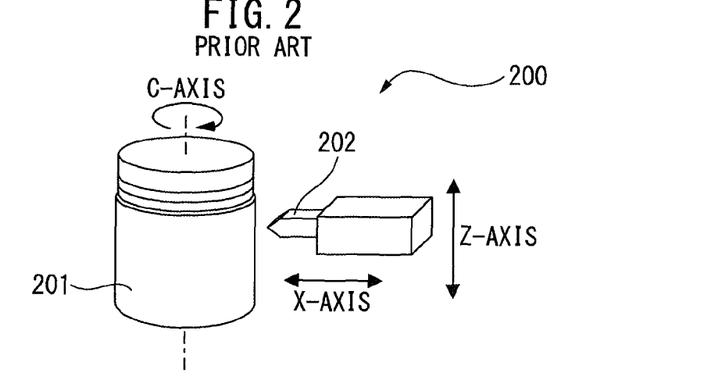
FIG. 2 is a perspective view of a conventional lathe.

In addition, as a machine tool which executes machining with a plurality of axes cooperatively synchronizing with each other, such a lathe as illustrated in FIG. 2 is known. In the lathe 200, a workpiece 201 is fixed on a rotary C-axis, and machining is executed by operating a tool 202 so as to be in contact with the workpiece 201 in a radial direction (X-axis) and a direction along the rotational axis (Z-axis).

Figure 3:
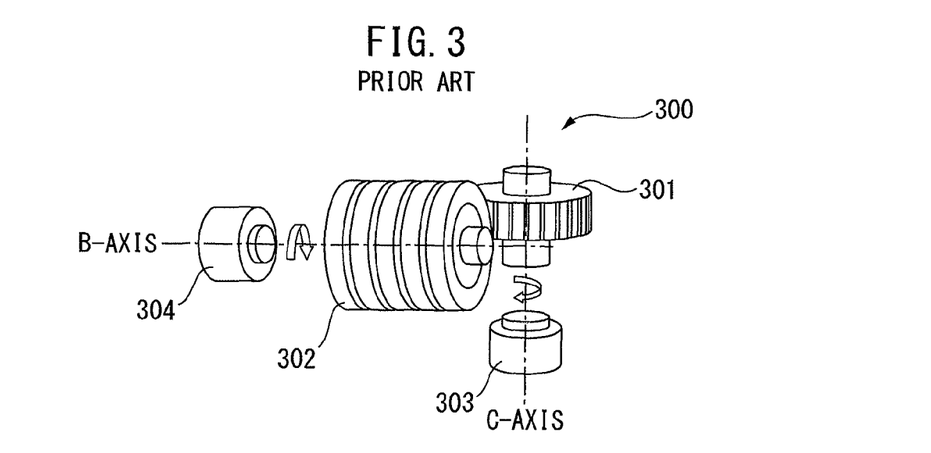
FIG. 3 is a perspective view of a conventional gear machining device.

Furthermore, as a machine tool which executes machining with a plurality of axes cooperatively synchronizing with each other, such a gear generating machining device as illustrated in FIG. 3 is known. In the gear generating machining device 300, a workpiece 301 is fixed on the rotary C-axis, and a tool 302 is rotated on a B-axis and an electric motor 304 for the B-axis and an electric motor 303 for the C-axis are controlled such that rotation of the B-axis and rotation of the C-axis synchronize with each other at a predetermined ratio (=the number of threads/the number of teeth), whereby machining is executed.

Figure 4A:
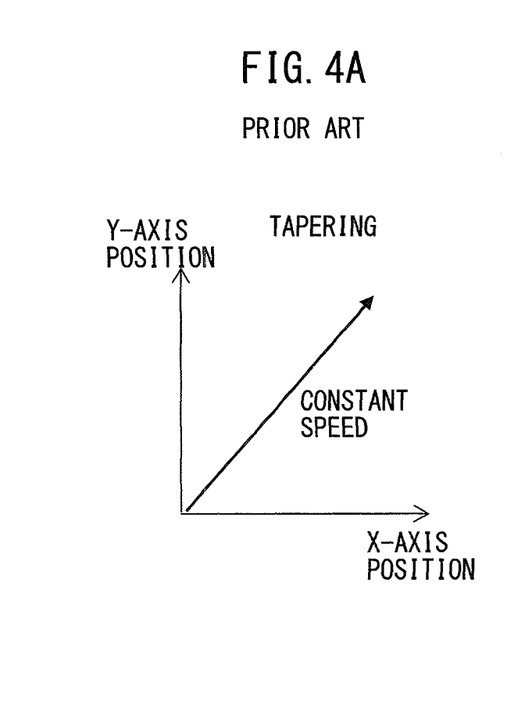
FIG. 4A is a graph illustrating a relationship between a Y-axis position and an X-axis position in a conventional machining center.

There is a case where the workpiece 101 is tapered on an X-Y plane of the vertical-type machining center 100. In this case, the electric motors for driving the X-axis and the Y-axis, respectively, operate synchronously at a speed corresponding to a taper angle θ (Vx=V cosθ, Vy=V sinθ). The relationship between the X-axis position and the Y-axis position of the tool 103 is illustrated in FIG. 4A.

Figure 4B:
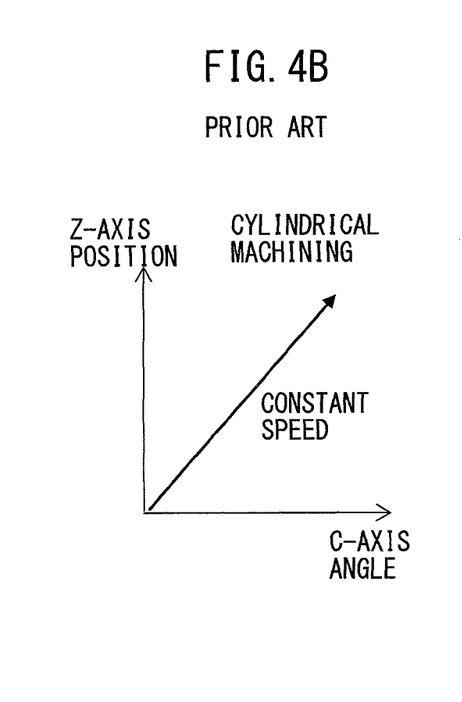
FIG. 4B is a graph illustrating a relationship between a Z-axis position and a C-axis angle in a conventional lathe.

Also when the cylindrical workpiece 201 is machined by the lathe 200, synchronous operation on the Z-axis is executed so as to be in proportional to a rotational speed around the C-axis. Relationship between a C-axis angle of the workpiece 201 and the Z-axis position of the tool 202 in this case is illustrated in FIG. 4B.

Figure 4C:
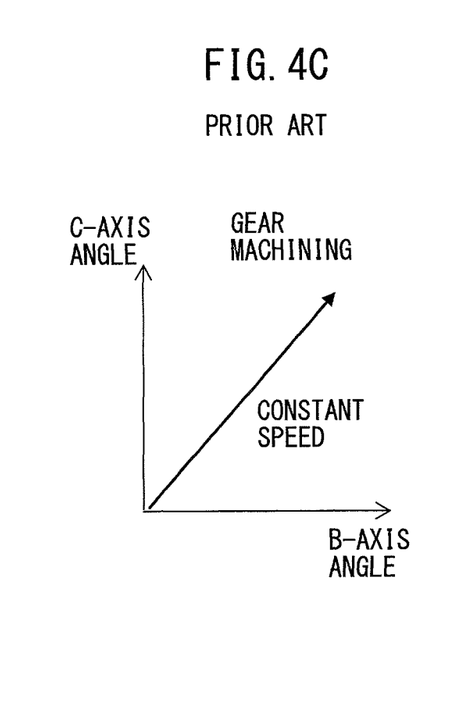
FIG. 4C is a graph illustrating a relationship between a C-axis angle and a B-axis angle in a conventional gear machining device.

When the workpiece 301 is machined by the gear generating machining device 300, synchronous operation on the C-axis is executed so as to be in proportional to a rotational speed around the B-axis (ratio=the number of threads/the number of teeth). The relationship between, the C-axis angle of the workpiece 301 and the B-axis angle of the tool 302 in this case is illustrated in FIG. 4C.

When machining a workpiece with two axes synchronizing with each other as described in above cases, vibration may occur depending on machining load disturbance and rigidities of a tool, the workpiece and a mechanism unit which drives them. Further, the vibration might be amplified due to interference between axes caused by contact between the workpiece and the tool, thereby adversely affecting machining precision.

In such a case, a conventional practice reduces vibration by a method of suppressing vibration by lowering responsiveness of an electric motor which drives each axis or a method of independently controlling vibration damping on each axis.

For example, a method of reducing vibration for respective axes by a vibration reduction filter corresponding to machine rigidity is known (e.g. Japanese Patent Publication No. 4658181 (JP4658181B). Although this conventional art enables reduction in vibration on a single axis, it has a problem that an effect of reducing vibration caused by interference between axes is insufficient.

On the other hand, as a method of reducing vibration due to interference between axes, a vibration damping control method for correcting a torque command by using a speed difference between two electric motors when they drive one movable member (e.g. Japanese Patent Publication No. 3492583 (JP3492583B)) is known. According to this conventional art, two electric motors are fixedly coupled and the two electric motors are driven at the same speed. Accordingly, the conventional art does not relate to a method of reducing vibration caused when an object is machined with a tool in contact therewith and cannot therefore reduce vibration caused when axes synchronize with each other at a different speed. In addition, the conventional art has a problem that the art cannot treat a non-coupling state such as a relationship between a tool and a workpiece.

An object of the present invention is to provide a servo controller which reduces vibration due to interference between axes caused when machining is executed while a plurality of axes driven by electric motors synchronize with each other.

SUMMARY OF THE INVENTION

A servo controller according to one embodiment of the present invention, which drives a first electric motor provided on a first axis and a second electric motor provided on a second axis in synchronization with each other, includes a first axis speed feedback obtaining unit configured to obtain an amount of speed feedback for the first axis, a second axis speed feedback obtaining unit configured to obtain an amount of speed feedback for the second axis synchronizing with the first axis, a speed conversion unit configured to obtain a conversion coefficient for making the amount of speed feedback for the first axis correspond to the amount of speed feedback for the second axis and converting the amount of speed feedback for the first axis by using the conversion coefficient, a speed difference calculating unit configured to calculate a speed difference between the converted amount of speed feedback for the first axis and the amount of speed feedback for the second axis, a torque correction calculating unit configured to calculate a torque correction value for vibration damping by using the speed difference, a second axis torque command correcting unit configured to correct a torque command for the second axis by using the torque correction value, a torque correction value converting unit configured to convert the torque correction value by using the conversion coefficient in order to correct a torque command for the first axis, and a first axis torque command correcting unit configured to correct the torque command for the first axis by using the converted torque correction value.

A servo controller according to another embodiment of the present invention, which drives a first electric motor provided on a first axis and a second electric motor provided on a second axis in synchronization with each other, includes a first axis speed feedback obtaining unit configured to obtain an amount of speed feedback for the first axis, a speed conversion unit for obtaining a conversion coefficient for making the amount of speed feedback for the first axis correspond to an amount of speed feedback for the second axis and converting the amount of speed feedback for the first axis by using the conversion coefficient, a second axis differentiation calculating unit configured to differentiate the converted amount of speed feedback for the first axis to multiply the obtained result by a predetermined constant, a second axis phase leading filter configured to execute phase adjustment, a second axis torque command correcting unit configured to correct a torque command for the second axis based on an obtained torque correction value for the second axis, a second axis speed feedback obtaining unit configured to obtain the amount of speed feedback for the second axis synchronizing with the first axis, a first axis differentiation calculating unit configured to differentiate the amount of speed feedback for the second axis to multiply the obtained result by a predetermined constant, a first axis phase leading filter configured to execute phase adjustment, a torque correction value converting unit configured to convert an obtained torque correction value for the first axis by using the conversion coefficient, and a first axis torque command correcting unit configured to correct a torque command for the first axis by using the converted torque correction value for the first axis.

DESCRIPTION OF THE DRAWINGS

These and other features and advantages of the present invention will be better understood based on the following detailed description, taken together with the drawings wherein.

DETAILED DESCRIPTION OF THE PREFERRED EMBODIMENT

In the following, a servo controller according to the present invention will be described with reference to the drawings. The technical scope of the present invention is not limited to exemplary embodiments thereof, but extends to an invention recited in the scope of claims for patent and its equivalent.

First Embodiment

Figure 5:
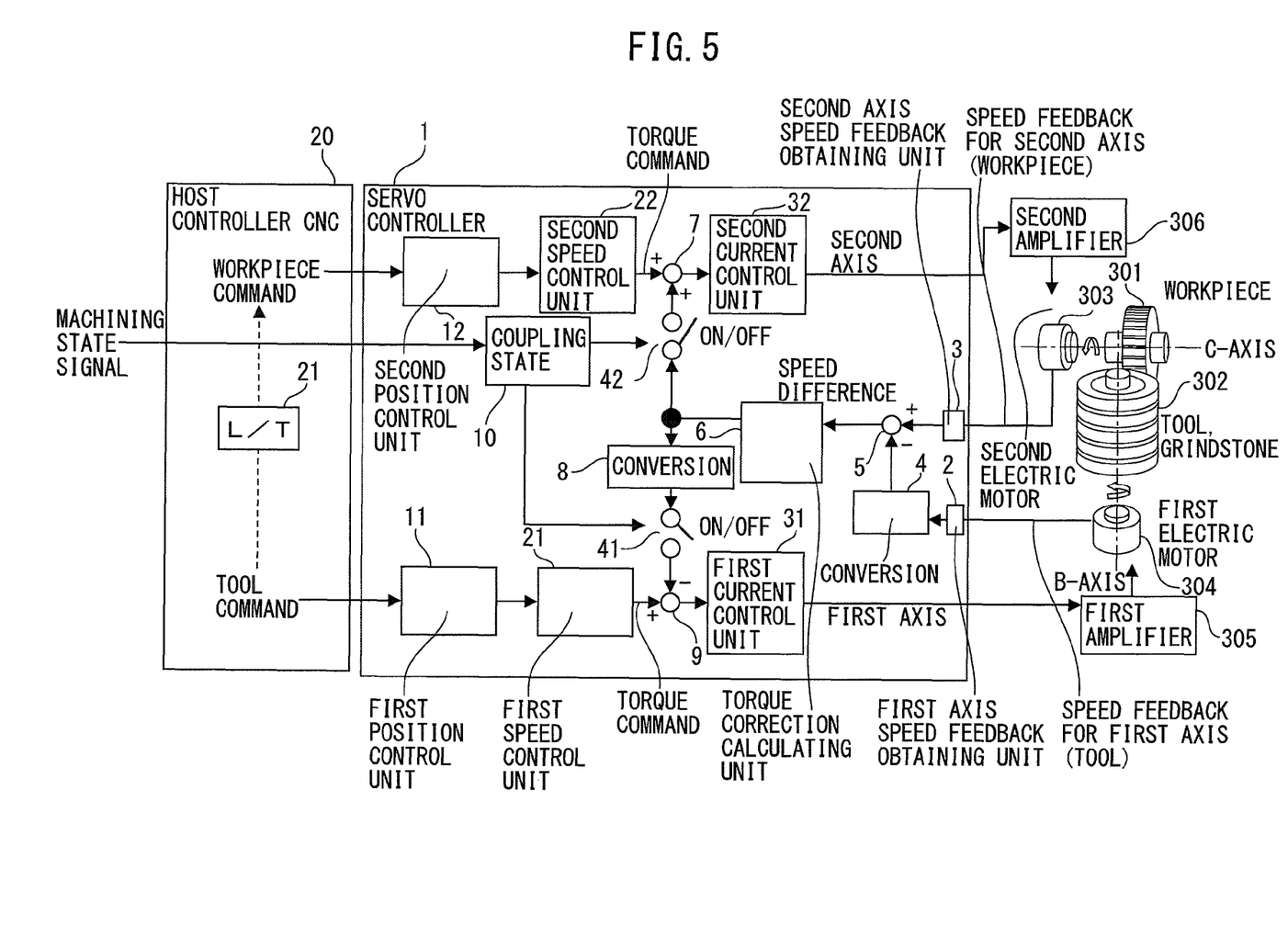
FIG. 5 is a block diagram illustrating a machining system including a servo controller according to a first embodiment of the present invention.

First, a servo controller according to the first embodiment of the present invention will be described using the drawings. FIG. 5 is a block diagram illustrating a machining system including a servo controller 1 according to the first embodiment of the present invention. The servo controller 1 according to the first embodiment of the present invention is a servo controller, which drives the first electric motor 304 provided on a B-axis as a first axis and the second electric motor 303 provided on a second axis in synchronization with each other, includes a first axis speed feedback obtaining unit 2 configured to obtain an amount of speed feedback for the first axis, a second axis speed feedback obtaining unit 3 for obtaining an amount of speed feedback for the second axis synchronizing with the first axis, a speed conversion unit 4 configured to obtain a conversion coefficient for making the amount of speed feedback for the first axis correspond to the amount of speed feedback for the second axis and converting the amount of speed feedback for the first axis by using the conversion coefficient, a speed difference calculating unit 5 configured to calculate a speed difference between the converted amount of speed feedback for the first axis and the amount of speed feedback for the second axis, a torque correction calculating unit 6 configured to calculate a torque correction value for vibration damping by using the speed difference, a second axis torque command correcting unit 7 configured to correct a torque command for the second axis by using the torque correction value, a torque correction value converting unit 8 configured to convert the torque correction value by using the conversion coefficient in order to correct a torque command for the first axis, and a first axis torque command correcting unit 9 configured to correct the torque command for the first axis by using the converted torque correction value.

The servo controller 1 receives input of a tool command for controlling the first electric motor 304 which rotates the tool 302 on the B-axis as the first axis and a workpiece command for controlling the second electric motor 303 which rotates the workpiece 301 as an object to be machined on the C-axis as the second axis from such a host controller 20 as a device for computer numerical control (CNC).

The tool command is input to a first position control unit 11 on a tool side (a first axis side), so that the first position control unit 11 outputs a speed command. The output speed command is input to a first speed control unit 21 on the tool side to output a torque command.

The output torque command is input to the first axis torque command correcting unit 9 together with a torque correction value output from the torque correction value converting unit 8, so that the first axis torque command correcting unit 9 outputs a corrected torque command.

The output torque command which has been corrected is input to a first current control unit 31 on the tool side to output a current command. The output current command is input to a first amplifier 305 to drive the first electric motor 304, thereby rotating the tool 302 on the B-axis.

The first electric motor 304 is provided with a speed sensor (not illustrated), so that an amount of speed feedback for the first axis detected by the speed sensor is input to the first axis speed feedback obtaining unit 2. The amount of speed feedback for the first axis may be directly obtained by the speed converting unit 4.

On the other hand, the workpiece command is input to a second position control unit 12 on a workpiece side (a second axis side), so that the second position control unit 12 outputs a speed command. The output speed command is input to a second speed control unit 22 on the workpiece side to output a torque command.

The output torque command is input to the second axis torque command correcting unit 7 together with a torque correction value output from the torque correction calculating unit 6, so that the second axis torque command correcting unit 7 outputs a corrected torque command.

The output torque command which has been corrected is input to a second current control unit 32 on the tool side to output a current command. The output current command is input to a second amplifier 306 to drive the second electric motor 303, thereby rotating the workpiece 301 on the C-axis.

The second electric motor 303 is provided with a speed sensor (not illustrated), so that an amount of speed feedback for the second axis detected by the speed sensor is input to the second axis speed feedback obtaining unit 3. The amount of speed feedback for the second axis may be directly obtained by the speed difference calculating unit 5.

In the servo controller according to the first embodiment of the present invention, when electric motors on two axes including the first electric motor 304 and the second electric motor 303, machine a workpiece in synchronization with each other at a predetermined speed ratio, an amount of correction for reducing vibration is calculated using a speed difference between the respective electric motors and a torque command is corrected using the obtained amount of correction, thereby reducing vibration due to interference between the axes.

With respect to the above speed difference, the speed difference is obtained by obtaining a conversion coefficient from the host controller 20 and converting an amount of one speed feedback (first axis) into a weight corresponding to an amount of the other speed feedback (second axis) by using the conversion coefficient. Specifically, the speed converting unit 4 obtains a conversion coefficient for making the amount of speed feedback for the first axis correspond to the amount of speed feedback for the second axis and converting the amount of speed feedback for the first axis by using the conversion coefficient. Conversely, the speed feedback for the second axis may be converted into a weight corresponding to the speed feedback for the first axis.

Since the above conversion coefficient corresponds to a ratio between speed commands for the respective axes, it can also be calculated from speed commands for the respective axes as represented by the following expression:

[conversion coefficient]=[speed command for the second axis]/[speed command for the first axis]

In other words, it is preferable to include at least one of a conversion coefficient obtaining unit (not illustrated) which obtains a conversion coefficient from the host controller 20 and a conversion coefficient calculating unit (not illustrated) which calculates a conversion coefficient based on a speed command for the first axis and a speed command for the second axis.

In the example of a gear generating machining device illustrated in FIG. 5, the workpiece 301 and the tool 302 rotate in synchronization with each other at a ratio of the number of threads L of the tool (a grindstone or a cutter) 302 to the number of teeth T on a gear of the workpiece 301 (L/T) to execute machining. The workpiece command speed can be obtained by the following expression:

[workpiece command speed]=[tool (cutter) command speed]×$L/T$

The servo controller 1 obtains this ratio (=L/T), i.e. a conversion coefficient, from the host controller 20, multiplies the amount of speed feedback for the first axis on the tool side by the ratio to convert the obtained result into a weight corresponding to a workpiece speed, thereby obtaining a speed difference as a difference from the amount of speed feedback for the second axis on the workpiece side by the following expression:

[speed difference]=[workpiece speed feedback]−[tool (cutter) speed feedback]×$L/T$ Specifically, the speed difference calculating unit 5 calculates a speed difference between the converted amount of speed feedback for the first axis and the amount of speed feedback for the second axis.

Figure 6:
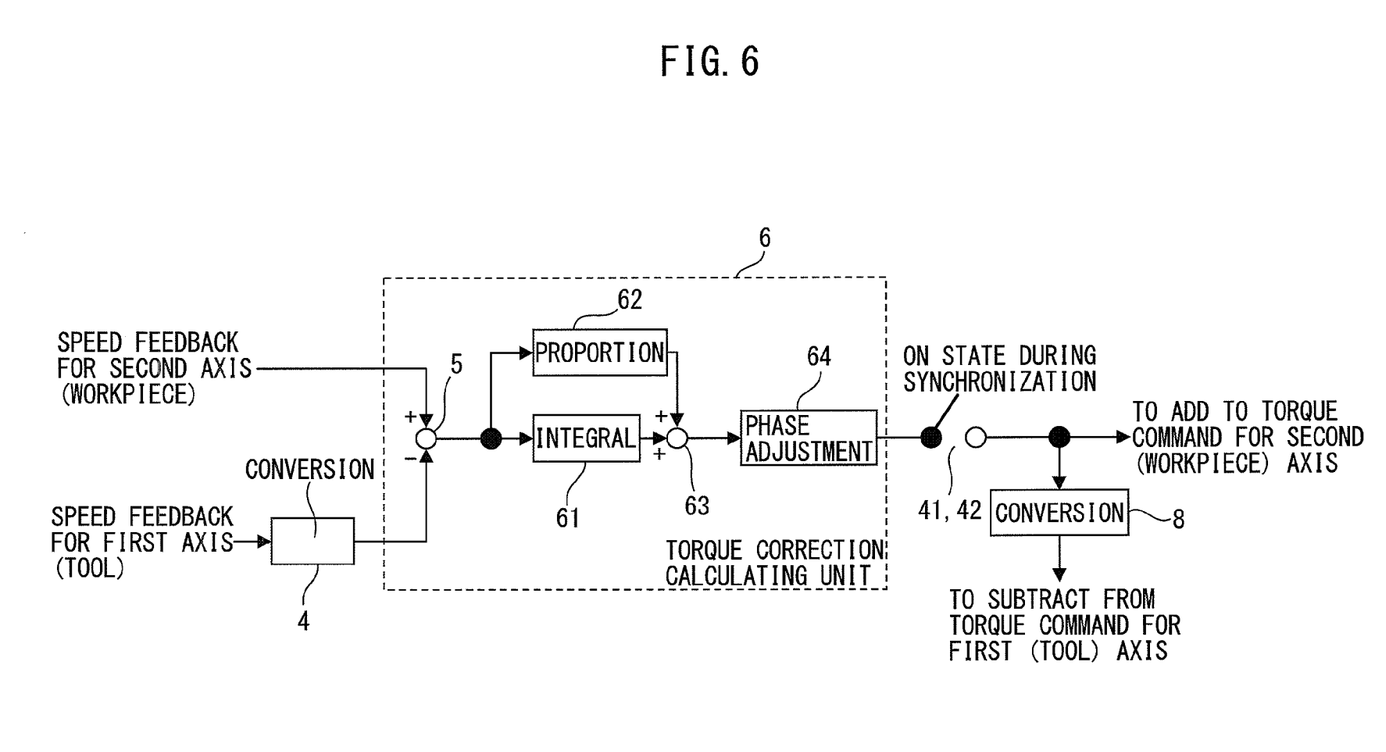
FIG. 6 is a diagram illustrating a configuration of a torque correction calculating unit included in the servo controller according to the first embodiment of the present invention.

By using thus calculated speed difference, the torque correction calculating unit 6 calculates a torque correction value for vibration damping. A configuration diagram of the torque correction calculating unit 6 is illustrated in FIG. 6. The torque correction calculating unit 6 includes an integral calculation unit 61 which multiplies an integrated value of speed differences by a first constant in order to correct torsional rigidity, a proportional calculation unit 62 which multiplies the speed difference by a second constant in order to correct friction, an addition unit 63 which adds a calculation result of the integral calculation unit 61 and a calculation result of the proportional calculation unit 62, and a phase leading filter 64 which executes phase adjustment of the added calculation results.

A torque correction procedure at the torque correction calculating unit 6 will be described in detail. As illustrated in FIG. 6, the speed difference calculating unit 5 calculates a speed difference between the amount of speed feedback for the first axis (tool) converted by the speed converting unit 4 and the amount of speed feedback for the second axis (workpiece). With the calculated speed difference, a proportional calculation for compensating for friction and integral calculation for compensating for spring rigidity are executed. For example, proportional calculation and integral calculation are executed based on the following calculation formulas:

$P = K2 \times$ speed difference (proportional calculation)

$I = K1 \times \Sigma$ speed difference (integral calculation), wherein K1 and K2 represent constants, and Σ represents an integral.

Friction means friction of such a rotary sliding unit as a bearing of a tool or a workpiece and friction of a contact part between the tool and the workpiece. Spring rigidity means torsional rigidity of coupling parts between the tool and an electric motor which drives the same and between the workpiece and an electric motor which drives the same and elastic deformation of a tool such as a grindstone or a hob cutter in gear generating machining, for example.

The results of the proportional calculation and the integral calculation are added by the addition unit 63 (=P+I), and based on the addition result, the phase leading filter 64 executes phase adjustment. This is for compensating for a delay in sampling of speed feedback or the like.

The result obtained by the phase-adjustment is taken as a torque correction, which corresponds to disturbance to be added to the electric motor and is added to or subtracted from a torque command to suppress disturbance in a feedforwarding manner, thereby enabling vibration reduction.

The torque correction is converted into a torque correction for the second axis by using a conversion coefficient obtained from the above-described host controller 20, which correction is added to or subtracted from the torque command. Conversely, it may be converted into a torque correction for the first axis.

In an example using the above-described gear generating machining device, for example, a new torque command for the workpiece axis and a new torque command for the tool (grindstone) axis are obtained by the following expression:

[new torque command for workpiece axis]=[torque command for workpiece axis]+[torque correction]

[new torque command for tool (grindstone) axis]= [torque command for tool (grindstone) axis]+ [torque correction]×(T/L).

The above-described torque correction is added to or subtracted from the torque command only in a state where the tool and the workpiece are in contact with each other, i.e., in a state where the workpiece is being machined. It is accordingly necessary to obtain a machining state signal indicating whether they are in contact with each other from the host controller or an external apparatus to determine whether correction is to be executed according to the state signal.

It is therefore preferable that the servo controller 1 illustrated in FIG. 5 further includes a coupling state detecting unit 10 which receives a machining state signal indicating whether the tool 302 and the workpiece 301 as an object to be machined are in contact with each other. The first axis torque command correcting unit 9 and the second axis torque command correcting unit 7 can be configured to correct a torque command for the first axis or a torque command for the second axis according to the machining state signal. In FIG. 5, when the tool 302 and the workpiece 301 are coupled, a first switch 41 is turned on, so that a torque correction value output from the torque correction value converting unit 8 is input to the first axis torque command correcting unit 9. Similarly, when the tool 302 and the workpiece 301 are coupled, a second switch 42 is turned on, so that a torque correction value output from the torque correction calculating unit 6 is input to the second axis torque command correcting unit 7.

Figure 7:
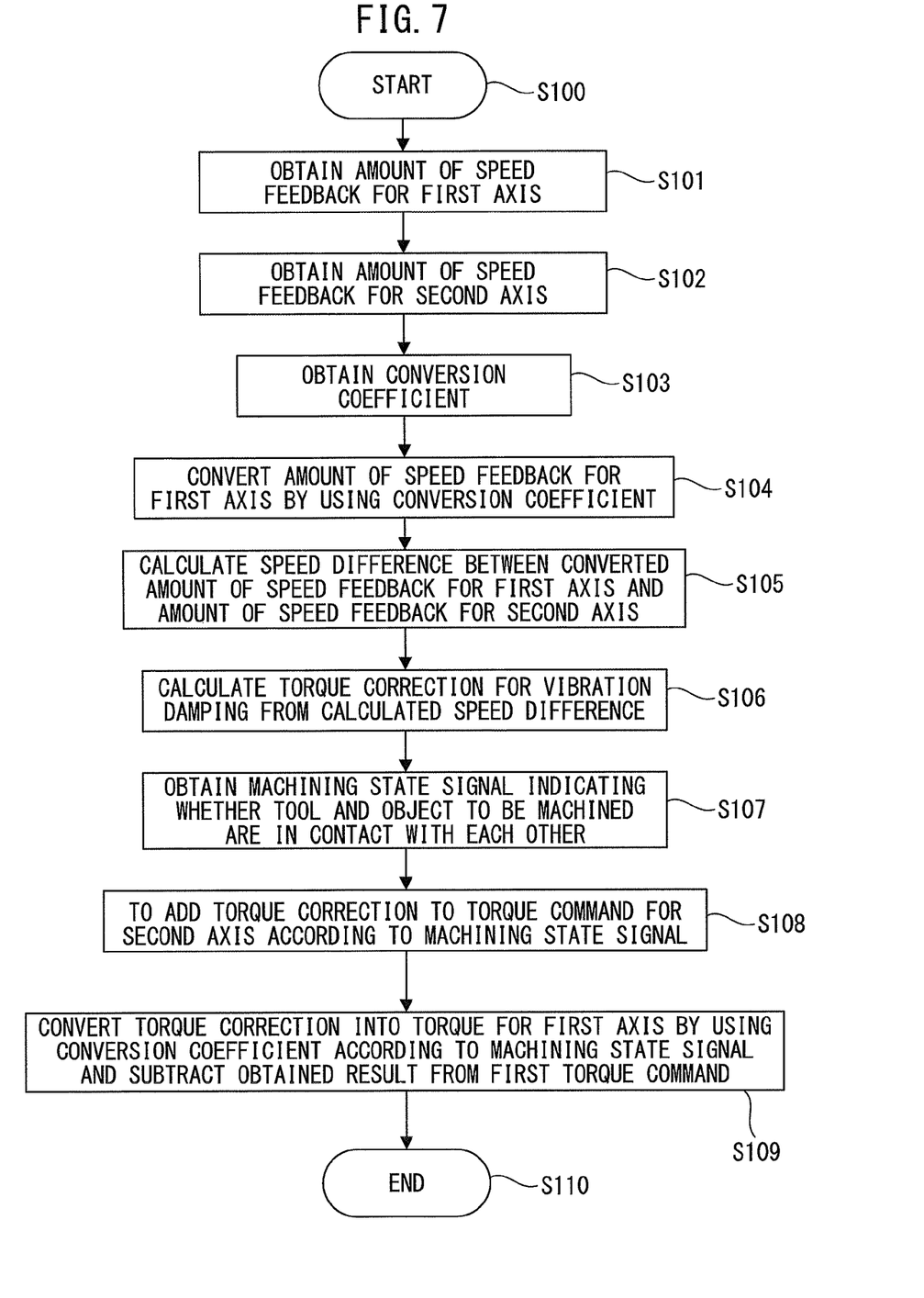
FIG. 7 is a flowchart for explaining an operation procedure of the servo controller according to the first embodiment of the present invention.

Next, an operation procedure of the servo controller of the present invention will be described with reference to the drawings. FIG. 7 is a flowchart for explaining an operation procedure of the servo controller according to the first embodiment of the present invention. First, at Step S101, the first axis speed feedback obtaining unit 2 (see FIG. 5) obtains an amount of speed feedback for the first axis. Next, at Step S102, the second axis speed feedback obtaining unit 3 obtains an amount of speed feedback for the second axis synchronizing with the first axis.

Next, at Step S103, the speed converting unit 4 obtains a conversion coefficient for making the amount of speed feedback for the first axis correspond to the amount of speed feedback for the second axis. Further at Step S104, the speed converting unit 4 converts the amount of speed feedback for the first axis by using the conversion coefficient.

Next, at Step S105, the speed difference calculating unit 5 calculates a speed difference between the converted amount of speed feedback for the first axis and the amount of speed feedback for the second axis.

Next, at Step S106, the torque correction calculating unit 6 calculates a torque correction value for vibration damping from the calculated speed difference.

Next, at Step S107, the coupling state detecting unit 10 receives a machining state signal indicating whether the tool and the workpiece are in contact with each other. Next, at Step S108, the second axis torque command correcting unit 7 corrects a torque command for the second axis by adding the torque correction to a torque command for the second axis according to the machining state signal. Next, at Step S109, the first axis torque command correcting unit 9 converts the torque correction into a torque correction for the first axis by using a conversion coefficient according to the machining state signal and subtracts the conversion result from a first torque command.

Figure 8:
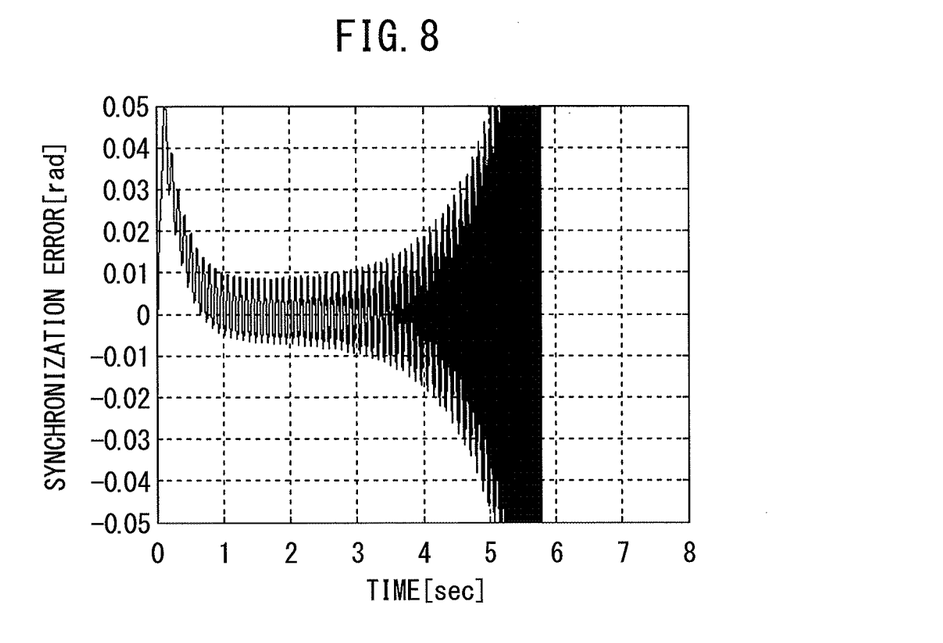
FIG. 8 is a diagram illustrating a temporal change in a synchronization error when machining disturbance is added to a workpiece and a tool.

Description will be made of a result obtained by confirming an effect thus obtained by correcting a torque command through numerical simulation with a gear generating machining device as an example. FIG. 8 is a diagram illustrating a temporal change in a synchronization error when machining disturbance is added to a workpiece and a tool. On the other hand, FIG. 9 is a diagram illustrating a temporal change in a synchronization error when the servo controller according to the first embodiment of the present invention is used.

An object to be controlled is a four-inertial system model, which is obtained by modeling a state where four inertias of a tool axis electric motor, a tool (grindstone), a workpiece gear, and a workpiece axis electric motor are coupled with each other by springs and viscous friction. In this case, coupling rigidity between the workpiece gear and the workpiece axis electric motor was assumed to have a mechanical resonance frequency of 300 [Hz] and coupling rigidity between the tool (grindstone) and the tool axis electric motor was assumed to have 1 [kHz]. When confirming, through numerical simulation, a synchronization error (=[workpiece axis speed]−[tool axis speed]×L/T) caused when machining disturbance of 11 [Hz] is added to the workpiece and the tool at the time of machining, vibration of 300 [Hz] occurs as illustrated in FIG. 8, and an unstable state appears. A speed control band for the workpiece axis in this case was assumed to be 55 [Hz]. A vertical axis of the graph illustrated in FIG. 8 represents a synchronization error [rad] and a horizontal axis represents time [sec].

Figure 9:
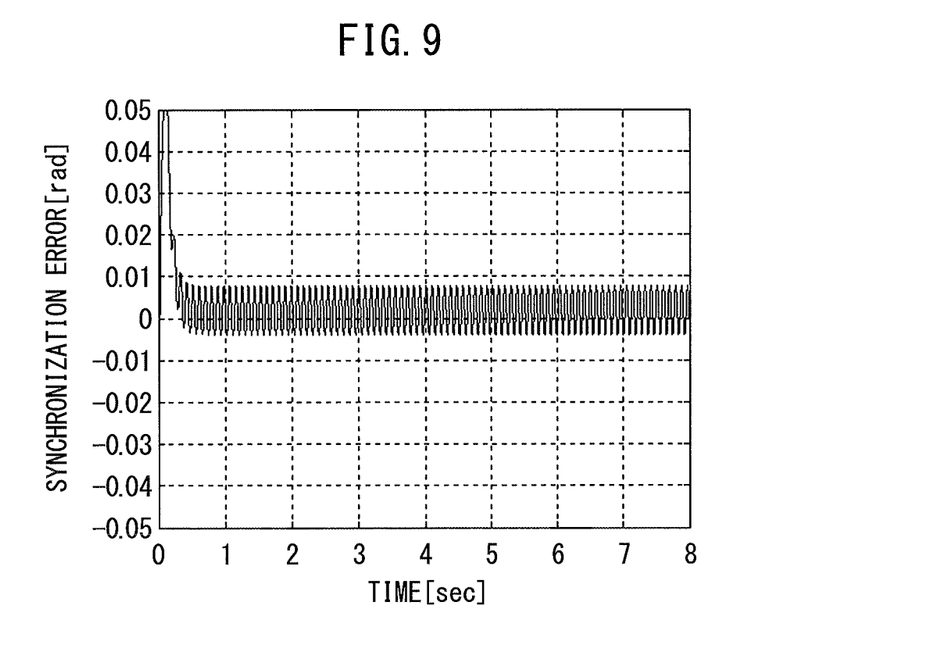
FIG. 9 is a diagram illustrating a temporal change in a synchronization error when the servo controller according to the first embodiment of the present invention is used.

When the servo controller according to the first embodiment was used, no vibration occurred even when the speed control band was increased up to 150 [Hz], so that the state remained stable as illustrated in FIG. 9.

As described in the foregoing, the servo controller according to The first embodiment enables reduction in vibration by obtaining a torque correction using a speed difference between two electric motors and adding or subtracting the same to or from torque commands for the respective axes.

It is also possible to suppress vibration in a higher frequency by further including a proportional term for correcting friction of an object to be controlled and an integral term for correcting torsional rigidity and further adding a phase regulator (phase leading filter) which corrects a sampling delay.

Second Embodiment

Figure 10:
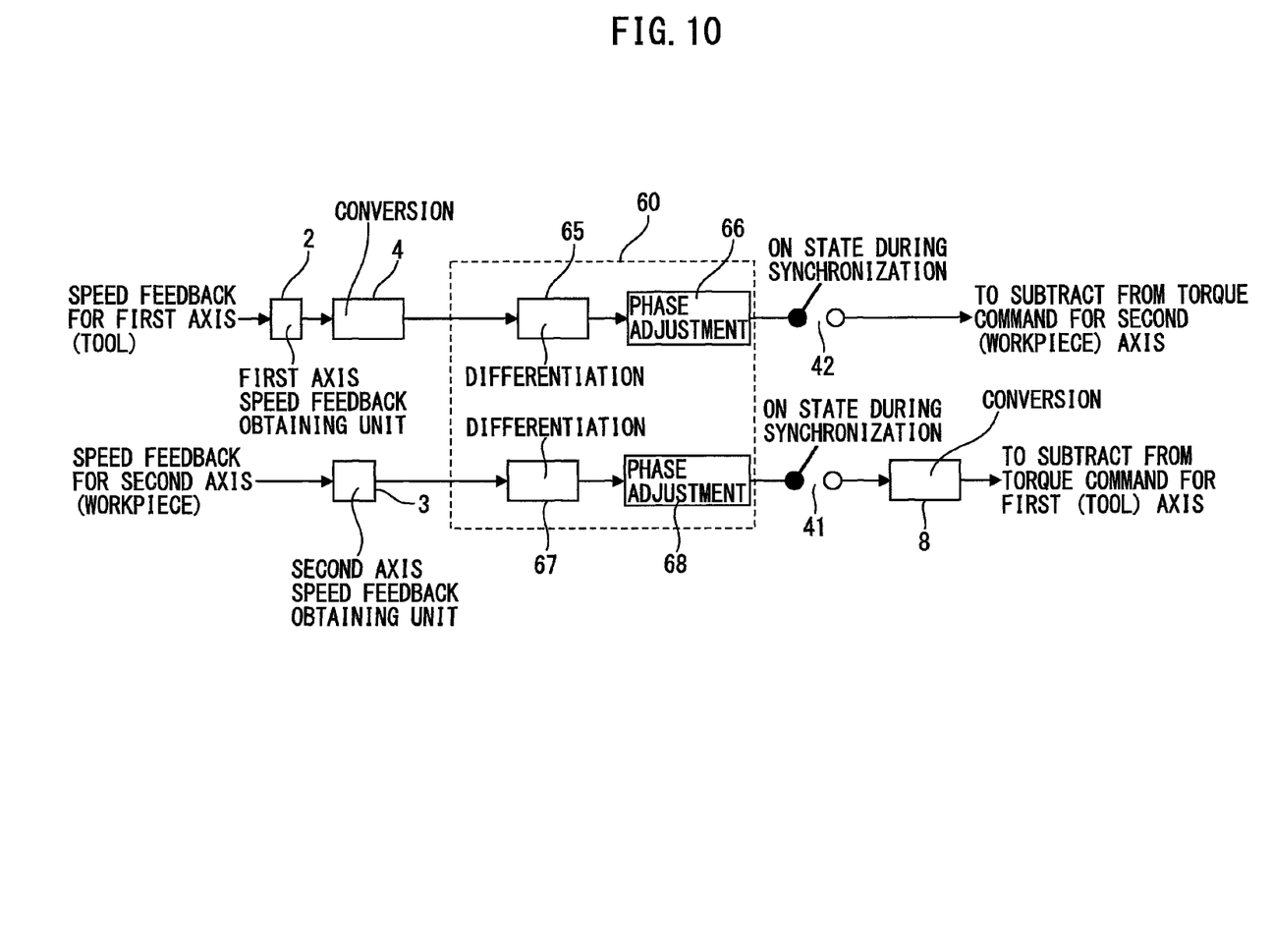
FIG. 10 is a diagram illustrating a configuration of a torque correction calculating unit included in a servo controller according to a second embodiment of the present invention.

Next, a servo controller according to the second embodiment of the present invention will be described with reference to the drawings. FIG. 10 illustrates a configuration of a torque correction calculating unit 60 of the servo controller according to the second embodiment of the present invention. Since the configuration of parts other than the torque correction calculating unit 60 is substantially the same as in the servo controller of the first embodiment illustrated in FIG. 5, detailed description thereof is omitted.

The servo controller according to the second embodiment of the present invention, which is a servo controller that drives a first electric motor provided on a first axis and a second electric motor provided on a second axis in synchronization with each other, includes the first axis speed feedback obtaining unit 2 configured to obtain an amount of speed feedback for the first axis, the speed conversion unit 4 configured to obtain a conversion coefficient for making the amount of speed feedback for the first axis correspond to an amount of speed feedback for the second axis and converting the amount of speed feedback for the first axis by using the conversion coefficient, a second axis differentiation calculating unit 65 configured to differentiate the converted amount of speed feedback for the first axis to multiply the obtained result by a predetermined constant, a second axis phase leading filter 66 configured to execute phase adjustment, the second axis torque command correcting unit 7 configured to correct a torque command for the second axis based on an obtained torque correction value for the second axis (see FIG. 5), the second axis speed feedback obtaining unit 3 configured to obtain the amount of speed feedback for the second axis synchronizing with the first axis, a first axis differentiation calculating unit 67 configured to differentiate the amount of speed feedback for the second axis to multiply the obtained result by a predetermined constant, a first axis phase leading filter 68 configured to execute phase adjustment, the torque correction value converting unit 8 configured to convert an obtained torque correction value for the first axis by using the conversion coefficient, and the first axis torque command correcting unit 9 configured to correct a torque command for the first axis by using the converted torque correction value for the first axis (see FIG. 5).

The servo controller according to the second embodiment is characterized in that, without using such a speed difference as used in the servo controller of the first embodiment, the first axis differentiation calculating unit 67 and the second axis differentiation calculating unit 65 execute differentiation calculation of speed feedback for one of the axes, and the first axis phase leading filter 68 and the second axis phase leading filter 66 execute phase adjustment, whereby a torque command for the other axis is corrected to reduce vibration.

In an example using the above-described gear generating machining device, for example, speed feedback for a tool axis as a first axis is converted into a weight corresponding to a speed for a workpiece axis as a second axis by using a conversion coefficient, so that the second axis differentiation calculating unit 65 differentiates the weight (difference per sampling) to multiply the result by an appropriate constant and the second axis phase leading filter 66 executes phase adjustment to subtract the obtained result from a torque command for the workpiece axis.

Further, speed feedback for the workpiece axis is differentiated by the first axis differentiation calculating unit 67 and the differentiation result is multiplied by an appropriate constant so as to be subjected to phase adjustment by the first axis phase leading filter 68, so that the obtained result is converted into a weight corresponding to the tool axis by using the above conversion coefficient to subtract the obtained weight from a torque command for the tool axis. A new torque command for the workpiece axis and a new torque command for the tool (grindstone) axis are obtained by the following expression:

[new torque command for workpiece axis]=[torque command for workpiece axis]−$K3$×[Δ speed feedback for tool axis]×($L/T$)

[new torque command for tool (grindstone) axis]= [torque command for tool (grindstone) axis]− $K3$×[Δ speed feedback for workpiece axis]×($T/L$), wherein K3 represents a constant and Δ represents a differentiation or a difference.

Also in this method, torque correction is to be added to or subtracted from a torque command only in a state where the tool and the object to be machined are in contact with each other, i.e., in a state where the workpiece is being machined. Accordingly, it is necessary to obtain a machining state signal indicating whether they are in contact with each other from a host controller or an external apparatus to determine whether correction is to be executed according to the state signal.

Figure 11:
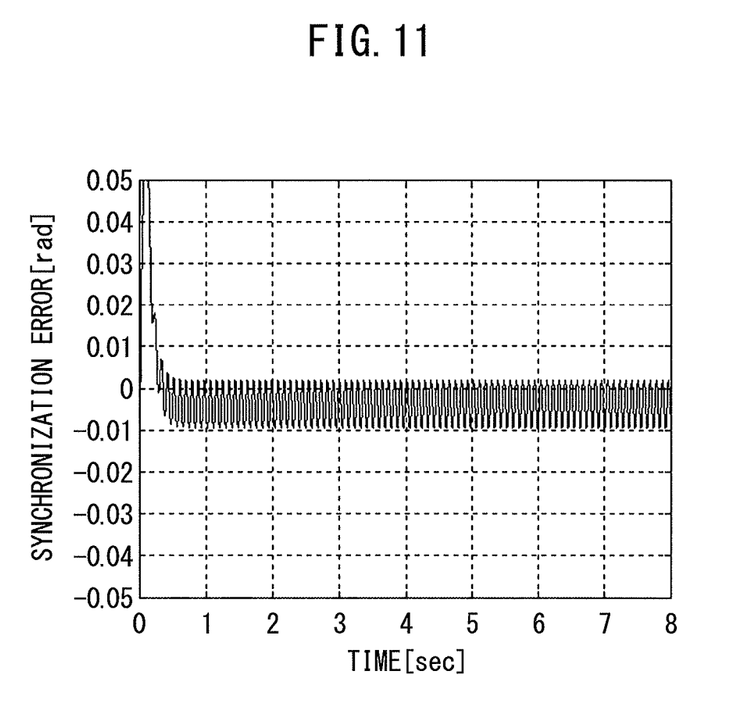
FIG. 11 is a diagram illustrating a temporal change in a synchronization error when the servo controller according to the second embodiment of the present invention is used.

As is the case with the first embodiment, illustrated in FIG. 11 is a result obtained by confirming an effect obtained by the servo controller according to the second embodiment through numerical simulation with a gear generating machining device as an example. In the servo controller according to the second embodiment, no vibration occurred even when a speed control band was increased up to 150 [Hz], and the state remained stable.

As described in the foregoing, the servo controller according to the second embodiment enables reduction in vibration by obtaining acceleration through differentiation of speed feedback and multiplying the obtained acceleration by a constant to correct a torque command.

Although the foregoing Examples have been described with respect to a servo controller which controls a gear generating machining device as an example, the invention is not limited thereto and is applicable also to other machine tools such as a vertical-type machining center or a lathe as long as it is a servo controller that controls a plurality of axes in synchronization with each other.

As described in the foregoing, the servo controller of the present invention enables reduction in vibration caused by interference between axes at the time of machining while synchronizing a plurality of axes driven by electric motors with each other.

What is claimed is:

1. A servo controller which drives a first electric motor provided on a first axis and a second electric motor provided on a second axis in synchronization with each other, comprising:
a first axis speed feedback obtaining unit configured to obtain an amount of speed feedback for the first axis;
a second axis speed feedback obtaining unit configured to obtain an amount of speed feedback for the second axis synchronizing with the first axis;

a speed conversion unit configured to obtain a conversion coefficient for making the amount of speed feedback for the first axis correspond to the amount of speed feedback for the second axis and converting the amount of speed feedback for the first axis by using the conversion coefficient;

a speed difference calculating unit configured to calculate a speed difference between the converted amount of speed feedback for the first axis and the amount of speed feedback for the second axis;

a torque correction calculating unit configured to calculate a torque correction value for vibration damping by using the speed difference;

a second axis torque command correcting unit configured to correct a torque command for the second axis by using the torque correction value;

a torque correction value converting unit configured to convert the torque correction value by using the conversion coefficient in order to correct a torque command for the first axis; and a first axis torque command correcting unit configured to correct the torque command for the first axis by using the converted torque correction value.

2. The servo controller according to claim 1, wherein the torque correction calculating unit includes an integral calculation unit which multiplies an integrated value of the speed differences by a first constant in order to correct torsional rigidity, a proportional calculation unit which multiplies the speed difference by a second constant in order to correct friction, an addition unit which adds a calculation result of the integral calculation unit and a calculation result of the proportional calculation unit, and a phase leading filter which executes phase adjustment of the added calculation results.

3. A servo controller which drives a first electric motor provided on a first axis and a second electric motor provided on a second axis in synchronization with each other, comprising:

a first axis speed feedback obtaining unit configured to obtain an amount of speed feedback for the first axis;

a speed conversion unit configured to obtain a conversion coefficient for making the amount of speed feedback for the first axis correspond to an amount of speed feedback for the second axis and converting the amount of speed feedback for the first axis by using the conversion coefficient;

a second axis differentiation calculating unit configured to differentiate the converted amount of speed feedback for the first axis to multiply the obtained result by a predetermined constant;

a second axis phase leading filter configured to execute phase adjustment;

a second axis torque command correcting unit configured to correct a torque command for the second axis based on an obtained torque correction value for the second axis;

a second axis speed feedback obtaining unit configured to obtain the amount of speed feedback for the second axis synchronizing with the first axis;

a first axis differentiation calculating unit configured to differentiate the amount of speed feedback for the second axis to multiply the obtained result by a predetermined constant;

a first axis phase leading filter configured to execute phase adjustment;

a torque correction value converting unit configured to convert an obtained torque correction value for the first axis by using the conversion coefficient; and a first axis torque command correcting unit configured to correct a torque command for the first axis by using the converted torque correction value for the first axis.

4. The servo controller according to claim 1, including at least one of a conversion coefficient obtaining unit which obtains the conversion coefficient from a host controller and a conversion coefficient calculating unit which calculates the conversion coefficient based on a speed command for the first axis and a speed command for the second axis.

5. The servo controller according to claim 1, further including a coupling state detecting unit which receives a machining state signal indicating whether a tool and a workpiece are in contact with each other, wherein the first axis torque command correcting unit and the second axis torque command correcting unit correct the torque command for the first axis or the torque command for the second axis according to the machining state signal.

* * * * *